Oct. 9, 1956   F. E. BROWN   2,765,467
MACHINE FOR ASSEMBLING HYPODERMIC SYRINGES
Filed Sept. 13, 1954   4 Sheets-Sheet 1
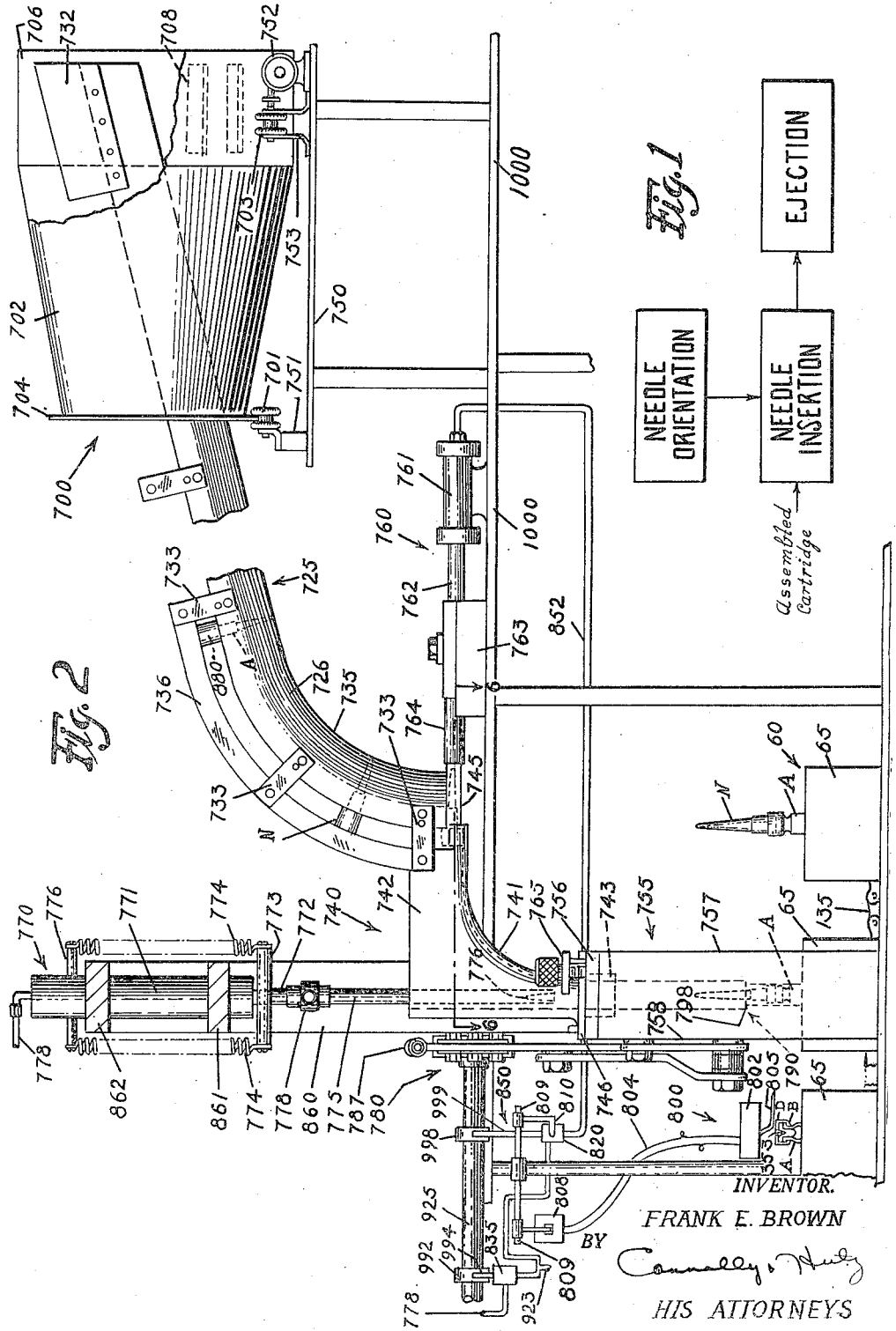
INVENTOR.
FRANK E. BROWN
BY Connally & Hurly
HIS ATTORNEYS

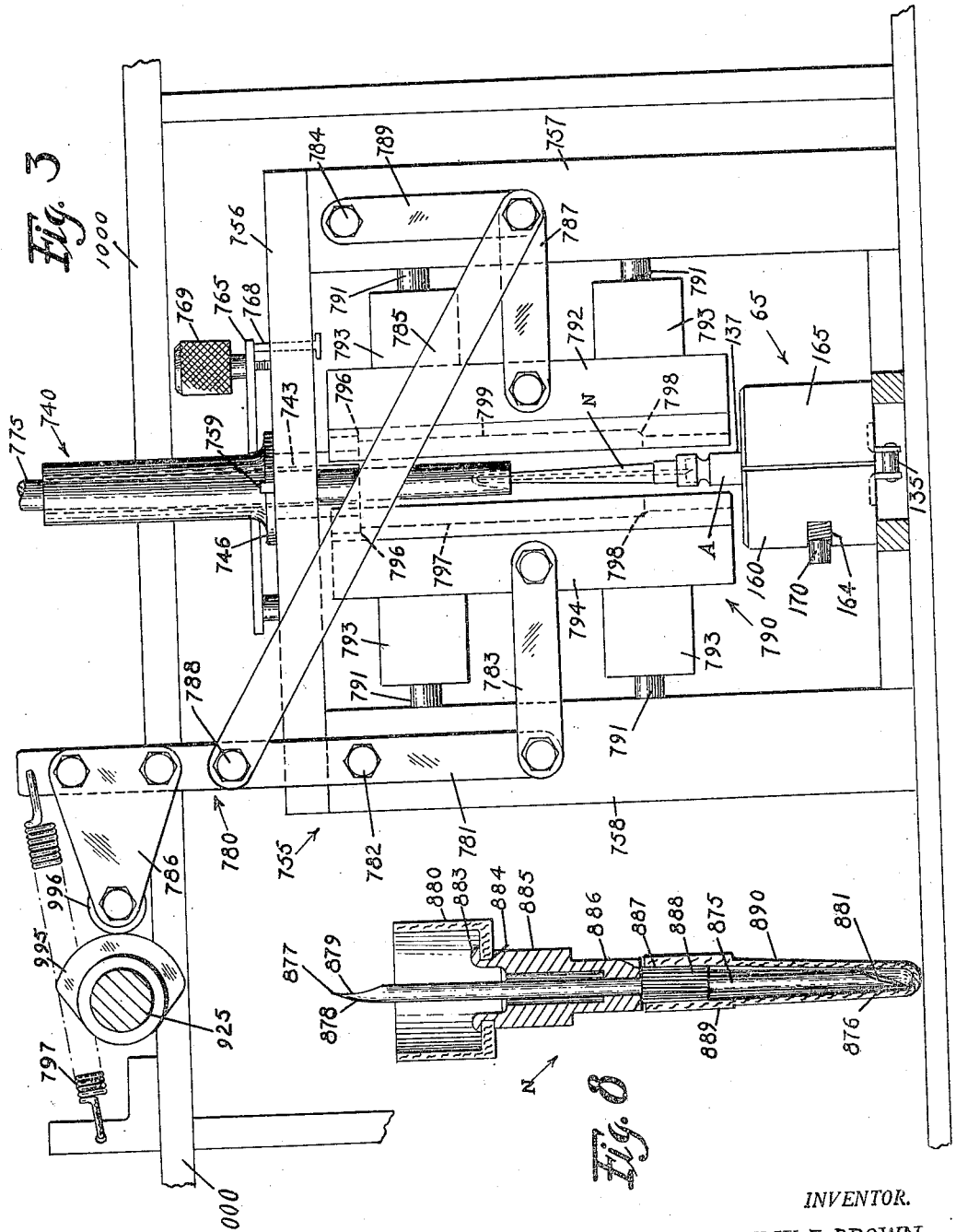

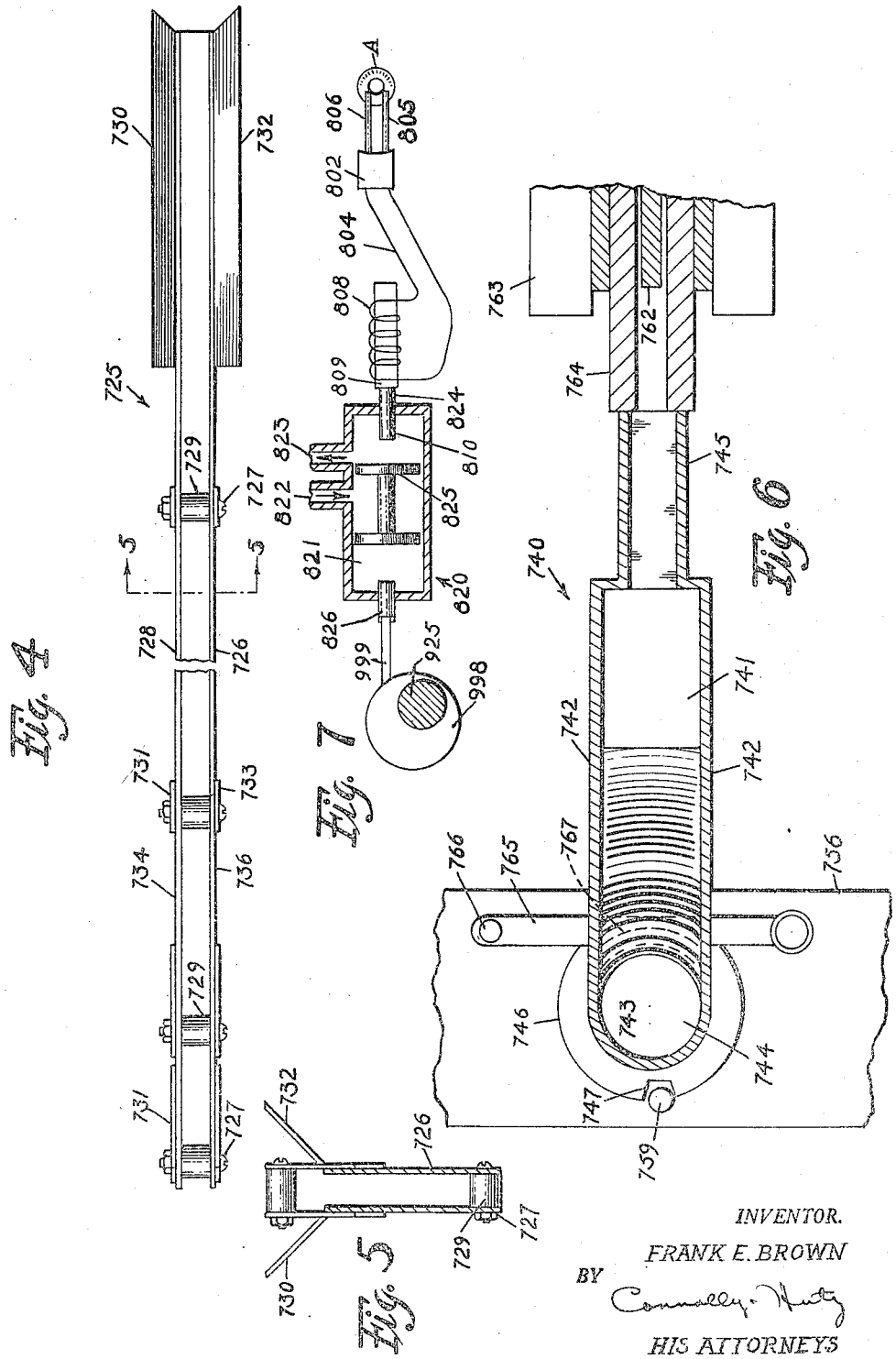

Fig. 9

United States Patent Office 2,765,467
Patented Oct. 9, 1956

2,765,467

MACHINE FOR ASSEMBLING HYPODERMIC SYRINGES

Frank E. Brown, Burbank, Calif., assignor to Chas. Pfizer & Co., Inc., Brooklyn, N. Y., a corporation of Delaware Application September 13, 1954, Serial No. 455,568

8 Claims. (Cl. 1—102)

This invention relates to a machine for assembling hypodermic syringes, and more particularly, to the feeding, orientation and application of covered hypodermic needles to the sealed up puncturable end of cylindrical containers, such as glass hypodermic syringe vials containing medicament, and the like. The instant invention is especially concerned with the provision of a machine which is capable of performing these operations on a fully automatic basis at a rapid production rate without loss of or damage to the covered needles or the filled vials.

While a wide variety of hypodermic syringes are known in the art and extensively used in administering medicaments, many of the operations associated with the assembly, filling and sealing of these syringes are even to this day performed by hand. In some instances these operations have been partially mechanized in the pharmaceutical industry, but complete mechanization has not heretofore been achieved on a practical or economical basis. The greatest difficulties in this respect have been encountered in the orientation and conveyance of the many delicate or complex parts which go into the assembly of such devices and in maintaining the necessary conditions of sterility during their assembly.

To meet this problem, a fully automatic machine for assembling, filling and sealing hypodermic syringe vials and attaching needles thereto is described and claimed in my copending application Serial No. 455,564, filed September 13, 1954. This machine is particularly adapted to produce a syringe cartridge and needle assembly as described in my copending application Serial No. 264,992, filed January 4, 1952. The assembly shown therein comprises a cylindrical container or vial, preferably of glass, having a reduced neck portion termination in an annular lip, a flanged stopper in the neck portion, a ferrule retaining the stopper therewithin, a protected needle carried by the stopper and ferrule, and a plunger in the other end of the cylinder. This plunger is a conventional type consisting of a cylindrical body of resilient material, such as rubber, provided with circumferential ribs about the outer periphery thereof and further provided with a threaded stud imbedded in one end to facilitate attachment of an elongated actuating plunger thereto.

The machine of the said copending application is adapted to assemble a hypodermic syringe vial of the type above described in a single continuous automatic operation. In particular, said machine is capable of collecting, collating, orienting and combining the various component parts of the novel syringe cartridge arrangement into a completed article, ready for immediate use. In general, the said machine comprises structure for supplying a plurality of cylindrical glass vials, dual conveyor means for transporting the vials in a predetermined sequence; structure for supplying orienting, feeding and applying plunger stoppers to one end of the said vials in sequence; filling the vials with a medicament; feeding orienting and applying resilient end closure stoppers to the filled vials; feeding, orienting and applying metallic ferrules over the stoppered ends of the vials to form a fluid-tight seal; and finally, feeding, orienting and applying a covered hypodermic needle assembly to the filled and sealed vial cartridge. The present invention is concerned with the latter operation and comprises a division of said prior copending application. The details of the vial feeding, conveyor transporting and plunger stopper applying mechanisms are described and claimed in my said copending application, S. N. 455,565, filed September 13, 1954; the details of the filling and closure stopper applying mechanism are described in my copending application, S. N. 455,566, filed September 13, 1954; and the details of the metallic ferrule applying mechanism are particularly described in my copending application, S. N. 455,567, filed September 13, 1954.

The filling, orienting and application of covered sterile hypodermic needles is but one phase of the problem of assembling devices of the type under consideration, but is particularly complicated by the difficulties encountered in handling contoured plastic components comprising the needle cover members. Another problem complicating an automatic application of covered sterile hypodermic needles to syringe cartridges is the difficulty peculiar to handling the resilient cover material in order to accurately apply the same to the filled vials without damaging the needle, the cover, or the vial. A further problem is the difficulty of providing a suitable simplified structure for cooperatively combining the sterile covered needles with the fragile glass vials in a continuous high speed operation without excessive breakage.

It is a particular feature of the present invention to obviate the aforementioned difficulties and to provide a machine which will systematically apply covered hypodermic needles to filled hypodermic cartridge vials at an unusually high rate of speed with substantially no danger of breakage, misalignment or damage to any of the fragile components. The supply, orientation and application of the covered needles in accordance with the present invention will best be understood by reference to the accompanying drawings and the specification and claims which follow. As shown in the drawings:

Fig. 1 is a block diagram depicting the various operations performed in the machine, forming a preferred embodiment of the invention;

Fig. 2 is a partial side elevation view illustrating the major components forming the instant invention;

Fig. 3 is a front elevation view illustrating the needle positioning mechanism of the machine of Fig. 2;

Fig. 4 is a top plan view of the needle filling mechanism of the machine of Fig. 2;

Fig. 5 is a section view along the line 5—5 of Fig. 4;

Fig. 6 is a section view along the line 6—6 of Fig. 2;

Fig. 7 is a schematic view illustrating a portion of the control mechanism for the machine of Fig. 2;

Fig. 8 is a sectional view illustrating a preferred form of covered needle assembly for use with the present invention; and Fig. 9 is a schematic view illustrating the drive control mechanism of the machine of Fig. 2.

As shown in Fig. 1, the present invention broadly concerns a machine in which a series of assembled cartridges are directed to a station at which needles, previously oriented into a desired position, are applied to the assembled cartridge, the needle bearing assembly thereafter being ejected in readiness for immediate use. The present machine forms a part of the complete assembling machine described in said copending application S. N. 455,564, filed September 13, 1954, and is in fact one of a pair of parallel duplicate arrangements for cooperating with the dual vial transporting conveyor means of said complete machine. Since the structures are identical the present description, will for the most part, be directed to a single assembly.

General description of the machine

The machine for performing these operations is more particularly shown in Figs. 2 and 3 of the drawings and includes an endless conveyor belt 60 formed by an endless chain 135 carrying spaced vial supporting blocks 65. Each of the blocks is formed to have two movable sections 160, 165 which are normally resiliently urged together by a spring 164 but which can be opened by means of a control bar 170. The block sections include vertical clefts or recesses serving as a vial receiving pocket 137 (see Fig. 3). The conveyor receives completed cartridge assemblies A which have been assembled, filled and closed at previous stations. The cartridge assemblies are carried in the blocks 65 with the flanged, stopper and ferrule bearing end exposed as shown at the left side of Fig. 2. Each cartridge comprises a glass vial A, a rubber closure stopper B having a central needle receiving recess 353, and an overlying perforated metallic closure cap or ferrule D. The conveyor is positioned to transport the cartridges into proximity with a hopper mechanism 700 serving as a storage chamber for supplying a plurality of covered needle assemblies in a predetermined alignment at a rapid rate to a feed chute mechanism 725.

The needle assembly is more particularly shown in Fig. 8 of the drawings and includes a hollow metallic hypodermic needle stem 875 having a pointed flesh piercing end 876 formed by grinding or otherwise cutting one side of the needle along a slanting transverse plane as shown at 881. The other end of the needle has a rubber stopper piercing or stopper puncture point 877 and preferably includes a curving surface which is slightly bent with respect to the cylindrical axis of the needle, as shown at 878, for cooperation with a ground or otherwise cut slanting surface 879 formed to project at an angle radially inwardly from the periphery of the needle towards the cylindrical axis.

The cover member which is associated with the needle includes a hollow cylindrical metallic needle holder 885 having a reduced diameter extension 886 and a needle clamping extension of a further reduced diameter 887. As will be readily understood by those skilled in the art, the lower extension 887 is adapted to be pinched or peened about the needle to form a cold weld therewith, the needle holder preferably being of a relatively soft metal such as brass and overlaid or clad with a corrosion-resistant film, such as nickel or chromium. Extension 887 advantageously includes a plurality of axially directed flutes or grooves 888 on its peripheral surface for a purpose hereinafter apparent. The upper portion of holder section 885 includes a radially directed recess 884 for receiving a centrally perforated cylindrical plastic fitting or extension sleeve 880 which is permanently united with section 885 as by peening the end of the section over the inner edge of the perforated plastic member, as shown at 883. The member 880 can be formed of any plastic material such as polyethylene, and the like.

The fluted extension 887 of needle holder 885 is adapted to interchangeably receive a contoured, conical needle cover member 890 for hermetically sealing the flesh piercing end of the needle. This needle cover member is preferably formed of a plastic material such as polyethylene and includes an enlarged reinforcing flange area 889 near the open mouth thereof. As shown, the reinforcing flange section is adapted to fit over the fluted extension 887 with a firm frictional fit so that the axial flutes 888 can cooperate with the needle cover surface to preclude entrapping air in the pocket of the needle cover. It also will be understood that this arrangement facilitates sterilizing the needle after application of the holder and cover, as by surrounding the same with a sterile medium.

The needles are received by the feed chute with the flesh piercing end oriented to hang vertically downwardly, as shown, and are sequentially fed to an inverter structure 740 wherein a fluid pressure differential servomotor mechanism 760 systematically transfers the covered needle assembled from the feed chute through the inverter mechanism to present the assembly with the stopper piercing end pointed downwardly to a needle positioning mechanism 790. The needle positioning assembly has cooperatively assembled therewith a second fluid pressure differential servomotor mechanism 770 which is adapted to be periodically energized to force the covered needle assembly through the needle positioning structure 790 onto the upper exposed end of a filled and sealed cartridge assembly A supported in cooperation with assembly 790 on a conveyor block 65 (see Fig. 3). As will be readily understood, the conveyor mechanism 65 may be of any desired linearly transporting type but preferably comprises an endless chain drive of the type more specifically set forth above and in my said copending applications.

From the above brief description, it will be readily understood that the covered hypodermic needles can be supplied to the hopper unit 700 in large quantities in a sterile condition. Thereafter, the covered needles are sequentially transferred via the feed chute mechanism 725 and the inverter mechanism 740 to the positioning mechanism 790 to be applied to a filled vial assembly without danger of contamination, jamming or damage to the relatively fragile assembly. When the needle assembly is so positioned, the servomotor mechanism 770 is energized to force the needle assembly down onto and over the sealed end of the vial to complete the cartridge unit in a condition for immediate use. The plastic sleeve extension 880 (Fig. 8) of the needle assembly slides over the ferrule of the filled vial with a firm frictional fit. At the same time, the stopper piercing bent end 878 (Fig. 8) moves into the central recess of the stopper and imbeds in the rubber material.

In order to prevent inadvertent operation of the needle applying mechanism, a sensing unit 800 is positioned to overlie the path of movement of conveyor blocks 65 and includes a depending pair of spaced electrically conductive contact fingers 805 and 806 (see Fig. 7) for the purpose of riding against the metallic ferrule on the sealed cartridge as the conveyor moves the cartridge toward the needle positioning assembly 790. The sensing mechanism is in turn connected to a valve control system 850 which is adapted to selectively energize the servomotor mechanism 760 via a fluid conduit 852. The arrangement is such, as will hereinafter become apparent, that the servo motor will not be energized to move a covered needle from chute 725 through the inverting assembly 740 to the positioning assembly 790 in the absence of a metallic ferrule on the exposed end of the cartridges supported in the closure blocks 65. It will thus be apparent that should prior stations fail to operate properly, as for example, by omitting to seal the stoppered end of the cartridge with the metallic ferrule, the imperfect cartridge will pass through station 790 without having a covered needle applied thereto. At the same time, it will be obvious that should a prior station fail to apply a closure stopper to the exposed end of the vial, the metallic ferrule will not be sufficiently high enough to contact fingers 805, 806 and again the imperfect vials will pass through station 790 without receiving a covered needle assembly. At the same time, warped, torn and generally defective ferrule elements will normally fail to close the circuit of sensing unit 800 to prevent application of a covered needle to the defective assembly.

The above description is a brief general resume of the several cooperative components of the present machine. To clarify further details, reference is made to Fig. 2 in combination with Figs. 3 to 8 inclusive showing the mechanism with greater structural definition.

Details of the needle hoppering mechanism

As previously pointed out, the hopper 700 is adapted to receive a large supply of covered needles, and for this purpose, comprises a generally frustro-conical chamber 702, preferably formed of stainless steel or some other well-known corrosion-resistant material. The chamber 702 includes a radially directed flange 704 surrounding an open mouth forming an outlet for the chamber. At its other end, the frustro-conical hopper includes a cylindrical base section 706 which carries internally thereof a plurality of spaced scoop-like elements 708 for the purpose of receiving individual covered needles and vertically lifting the needle as the hopper is rotated to a point overlying the feed chute mechanism 725. The feed chute advantageously projects through the open mouth of the hopper into proximity with the scope elements 708.

The hopper assembly is mounted for rotation upon three roller elements, only two of which, 701 and 703, appear in the drawing. It will be understood, however, that a further roller member identical to roller 703 is provided opposite the roller 703 on the other side of the hopper. Rollers 701 and 703 are formed to have a dumbbell-like shape, roller 701 being positioned directly under flange 704 along the vertical center line of the hopper and serving to effectively limit any axial displacement of the same. On the other hand, roller 703 and its mate (not illustrated) are positioned at diametrically opposite points on the basal periphery of the hopper substantially midway of the cylindrical base 706 and serve to prevent any lateral (transverse) displacement of the hopper. The rollers are supported upon a table 750 carried on common support 1000 by means of bracket members 751 and 753. A drive motor 752, which may be of any conventional form, preferably a fractional horsepower electric motor, is also carried by table 750 and is connected to rotate roller member 703 to frictionally drive the hopper. It will be readily appreciated that the present arrangement provides an exceedingly simplified structure of an inexpensive nature which is readily disconnectable for purposes of sterilization, repair and the like.

*Details of the needle feeding and inverting mechanism*

As previously indicated, the covered needles are directed from the hopper assembly 700 in sequence by means of a feed chute arrangement 725. As will be more readily understood by reference to Figs. 4 and 5 of the drawings, the feed chute comprises a pair of transversely spaced guide plate members 726, 728, which are fixedly positioned apart a predetermined width by means of bolt elements 727 and spacer members 729. The upper end of the feed chute projects through the open mouth of the hopper into proximity with the scope elements 708 and includes a pair of opposed angularly directed upstanding guide ears 730 and 732. The lower end of the feed chute is sharply curved downwardly as shown at 735 in Fig. 2 and is provided with a plurality of upstanding pairs of support arms 731, 733 for maintaining a curved guide rail assembly 734, 736 in juxtaposition to the chute 725. At its lower terminus, the chute 725 is integrally connected with the inverting structure 740.

The inverting assembly comprises a second chute-like arrangement having a curved integral guideway providing vertically upstanding guide walls 742 and a vertically curved floor 741, the floor 741 merging with sidewalls 742 at the lower end of the chute-like structure to form a circular guide neck 743. At its upper end, floor 741 is formed integral with a semi-cylindrical seating area 745, the area 745 serving as a repository for receiving the covered flesh piercing end of the needle assembly as they are discharged from out of chute 725 and facing the stoppering piercing end toward the lower outlet mouth 744 (Fig. 6) of the guideway. The semi-cylindrical section 745 is in turn fixedly connected as by welding, bolting, or the like with a guide sleeve or tube 764 supported on a bearing plate 763 on the common support 1000. Sleeve 764 in turn receives the extended end of a piston rod 762 projecting from cylinder 761 of the servomotor 760, the cylinder 761 also being mounted on the common support 1000. The arrangement is such that the needle assembly in seating area 745 is aligned with rod 762.

The spacing between the guide plates 726, 728 of the feed chute 725 is such that the covered needle assembly which, as more particularly shown in Fig. 8, is truncated to have an enlarged sleeve extension 880 surrounding the stopper puncturing end of the needle will ride upon the upper edges of plates 726, 728 to depend the flesh piercing covered portion of the needle between the plates in the manner illustrated in Fig. 2. With this arrangement, simple selection of a suitable gradient for the chute 725, as determined by the weight and center of gravity of the needle assembly, will serve to continuously and faultlessly gravity feed the needle assemblies from their first contact with the feed chute between guide ears 730, 732 within the hopper mechanism to their ultimate rest position in contact with reception area 745 and the floor 741 of the inverting structure 740. It will thus be understood that energization of the servo motor 760 with the needle assembly positioned as indicated in Fig. 2, will serve to eject the needle down the sloping floor 741 through the guide neck 743 into the positioning mechanism 790.

*Details of the needle positioning and applying mechanism*

The needle positioning and applying mechanism is best illustrated in Figs. 2 and 3 of the drawings. As shown in Fig. 2, the needle positioning mechanism 790 is mounted directly beneath a needle applying mechanism 770 comprising a fluid pressure differential servomotor having a cylinder 771 fixedly retained in a vertical position by means of yokes 861 and 862 extending from a vertical stanchion 860 rising from the common support 1000. The servomotor includes a reciprocable piston element 772 which is provided with a fixed cross member 773 to which is attached a pair of biasing springs 774, the springs in turn being connected to a cross pin 776 carried by the stationary cylinder 771. With this arrangement, piston rod 772 is normally retained in its upper limit position in which cross bar 773 abuts the end wall of the cylinder.

The extended end of the piston rod is provided with an adjustable coupling member 778 which in turn detachably carries a needle applying rod 775, the rod being so positioned as to be centered within the guiding neck 743 of the inverter mechanism 740. The lower end of the applying rod is recessed as indicated at 776 in Fig. 2 for the purpose of receiving the conical end of the cover of the needle assembly to firmly and positively center the needle in a manner hereinafter apparent.

The needle positioning mechanism is more particularly illustrated in Fig. 3 of the drawings and includes a stationary support 755 comprising opposed, upright stanchions 757 and 758 connected by a cross piece 756 which serves as a supporting table for the inverter structure 740. The cross piece 756 carries an upstanding peg 759 which is adapted to cooperate with a notch 747 (see Fig. 6) in the flared base 746 of the inverter chute for fixedly retaining the inverter assembly and drop out opening 744 in precise alignment with the cover positioning mechanism 790. A latching arm 765, pivotally mounted as at 766 to the cross piece 756, includes a configurated recess 767 for frictionally abutting the curved side of the inverter unit and locking the unit in proper position with notch 747 centered on peg 759. The lever includes a dowel pin, or the like, guide means 768 and a threaded locking knob 769, the arrangement being such that tightening of knob 769 serves to frictionally lock the dowell pin 768 against the under surface of cross piece 756 to hold the inverter unit in a predetermined position.

The guide neck 743 of the inverter unit extends through an opening in cross piece 756 between a pair of opposed clamping jaws 792 and 794 mounted for reciprocable movement toward and away from each other on opposed guide pins 791 projecting from the respective stationary stanchions 757 and 758. For this purpose the clamping jaws carry centrally perforated cooperating boss members 793 which ride on the pins 791. Each of the clamping jaws is centrally grooved in a vertical direction to present opposing slot-like recesses 797 and 799 of varying depth having radial shoulders as shown at 796 and 798. The offset shoulders of the recesses cooperate to receive the lower end of guide neck 743, the extended end of the applying rod 775 (which projects through neck 743 to midway of the height of the clamping blocks) and the filled cartridge assembly A whereby all of the components may be vertically aligned simultaneously.

Inspection of Fig. 3 will further indicate that the lower end of the clamping blocks extends to proximity with the upper surface of the closure blocks 65 in such manner that as the blocks are moved together, the supported cartridge vial A is clamped between the blocks, the lower recess shoulder 798 being gradually sloped outwardly of the respective blocks to form a narrowing pocket or groove when the blocks are in clamping position. With this arrangement, vertical movement of rod 775 in a downward direction will thrust the needle assembly axially downwardly whereby shoulders 798 center the open end of the needle cover and readily guide it to proper position in alignment over the sealed end of the vial A with the stopper piercing end of the needle overlying the recess 353 (see Fig. 2) in the stopper.

Movement of the control blocks toward and away from each other is controlled by means of a cam and linkage arrangement from a main drive and control shaft 925. As shown in Fig. 3, clamping block 792 is pivotally connected with a link 787 which in turn is pivotally connected to a further link 789. Link 789 has its free end pivotally mounted on the stationary stanchion 757. This forms a toggle linkage in which the pivot center is in turn pivotally connected to a cross bar element 785, the bar 785 being pivotally connected as at 788 to a rockable lever 781. Lever 781 is mounted for rotation about a fixed pivot 782 on stanchion 758 and at its lower free end is pivotally connected to a further link 783. Link 783 is in turn pivotally connected to the clamping block 794. The upper end of lever 781 carries a plate 786 mounting a rotatable cam follower 996 which is adapted to cooperate with a cam 995 carried on control shaft 925. The follower is normally retained in contact with the control cam by means of a spring 797 connected between the upper end of lever 781 and a bracket on the main support 1000.

From the above description, it will be apparent that linkage 780 comprises an equal force toggle mechanism which synchronously moves clamping plates 792 and 794 toward and away from each other as cam 995 and shaft 925 rotate. As will be readily understood, the relative positioning and contour of cam 995 is so arranged that the clamping blocks are moved apart as conveyor 60 moves an assembled vial A between the clamping blocks 792 and 794. As the conveyor is intermittently operated, the support block 65 and cartridge A are arrested midway of clamp blocks 794 and 792, at which time the control cam 995 operates linkage 780 to move the clamping blocks together. As the clamping blocks are moved toward clamping engagement, the servomotor 760 (Fig. 2) is energized to eject a needle from reception area 745 whereupon the needle moves down the inclined floor 741 of the inverter into engagement with the clamping jaws at about the lower shoulder 798 in a position which is directly above the vial and in alignment therewith and with the end of applying rod 775. At substantially the same instant, the cylinder 770 is energized to move the piston rod 772 against the bias of springs 774 to bring rod 775 into engagement with the flesh piercing covered end of the needle assembly, in the manner illustrated in the figure, to force the needle assembly down over the upper end of the vial assembly. As will be readily understood, this action serves to imbed the leading end of the needle within the puncturable rubber stopper in the vial, and at the same time, to frictionally slip the cover sleeve 880 (Fig. 8) over the metallic closure ferrule surrounding the vial stopper to provide a firmly united and readily handled completed hypodermic syringe cartridge.

Details of the ferrule sensing mechanism

The ferrule sensing and control mechanism is shown in Figs. 2 and 7 of the drawings and includes a microswitch unit 802 supporting a pair of vertically depending fingers 805, 806 which project over the path of closure 60 into proximity with the upper surface of the conductive metal ferrules on the vials A. Microswitch 802 is connected via wiring 804 to a conventional solenoid mechanism 808. The solenoid 808 is in turn adapted to actuate a control rod 809 having an actuator extension 810. Adjacent control rod 809 and extension 810 there is provided a shuttle type control valve unit 820. Referring particularly to Fig. 7, this unit includes a fluid chamber 821 having an inlet line 822 and an outlet line 823. Communication between the inlet and outlet lines is normally adapted to be blocked by a reciprocable valve element 825. Valve element 825 can be shuttled back and forth in chamber 821 by means of the actuator extension 810 and a rod member 826 which project through the ends of the fluid chamber 821 in the manner illustrated in the figure. The actuator 810 is carried by the core rod 809 of the solenoid 808, and actuator rod 826 is connected to a cam follower 999 which is adapted to be axially reciprocated by means of a cam 998 on the main control shaft 925. The arrangement is such that follower 999 is periodically reciprocated by cam 998 to move the valve to a position in which communication between inlet 822 and outlet 823 is blocked. On the other hand, actuator 810 is adapted to be reciprocated by the solenoid 808 to move the valve in an opposite direction to establish communication between inlet 822 and outlet 823. It will thus be understood that as a cartridge A carrying a metallic closure ferrule moves beneath senser unit 800, a circuit between contact fingers 805 and 806 is established to close microswitch 802 and energize solenoid 808. Energization of the solenoid serves to move valve 825 to establish communication between the inlet and outlet lines whereby the servomotor 760 is energized to eject a needle assembly N from the reception area 745 in timed relationship with the movement of the conveyor to position the cartridge assembly A directly beneath the outlet 744 of unit 740. The servomotor 770 is then energized to apply the needle assembly to the cartridge as heretofore described. Subsequent to the needle applying operation, cam 998 moves the follower 999 to reset valve 825 in a position in which it closes communication between the source 923 and the piston cylinder 761, thereby opening the piston to exhaust and allowing a conventional spring return mechanism to withdraw the piston rod 762 within guideway 764 for a subsequent operation.

Control of servomotor 770 is obtained by means of a cam 992 operating a follower 994, which follower is in turn connected to open and close a control valve 835 positioned between the source 923 and a conduit 778 leading to the end of cylinder 771 of the servomotor. It will be understood that cam 992 is so oriented with respect to cam 998 and the movement of the conveyor 60 as to energize servomotor 770 at the proper interval, i. e., when the needle assembly is moving toward engagement with the top of a vial clamped between jaws 792 and 794 of the needle positioning mechanism of Fig. 3.

The drive and control mechanisms

Figure 9:
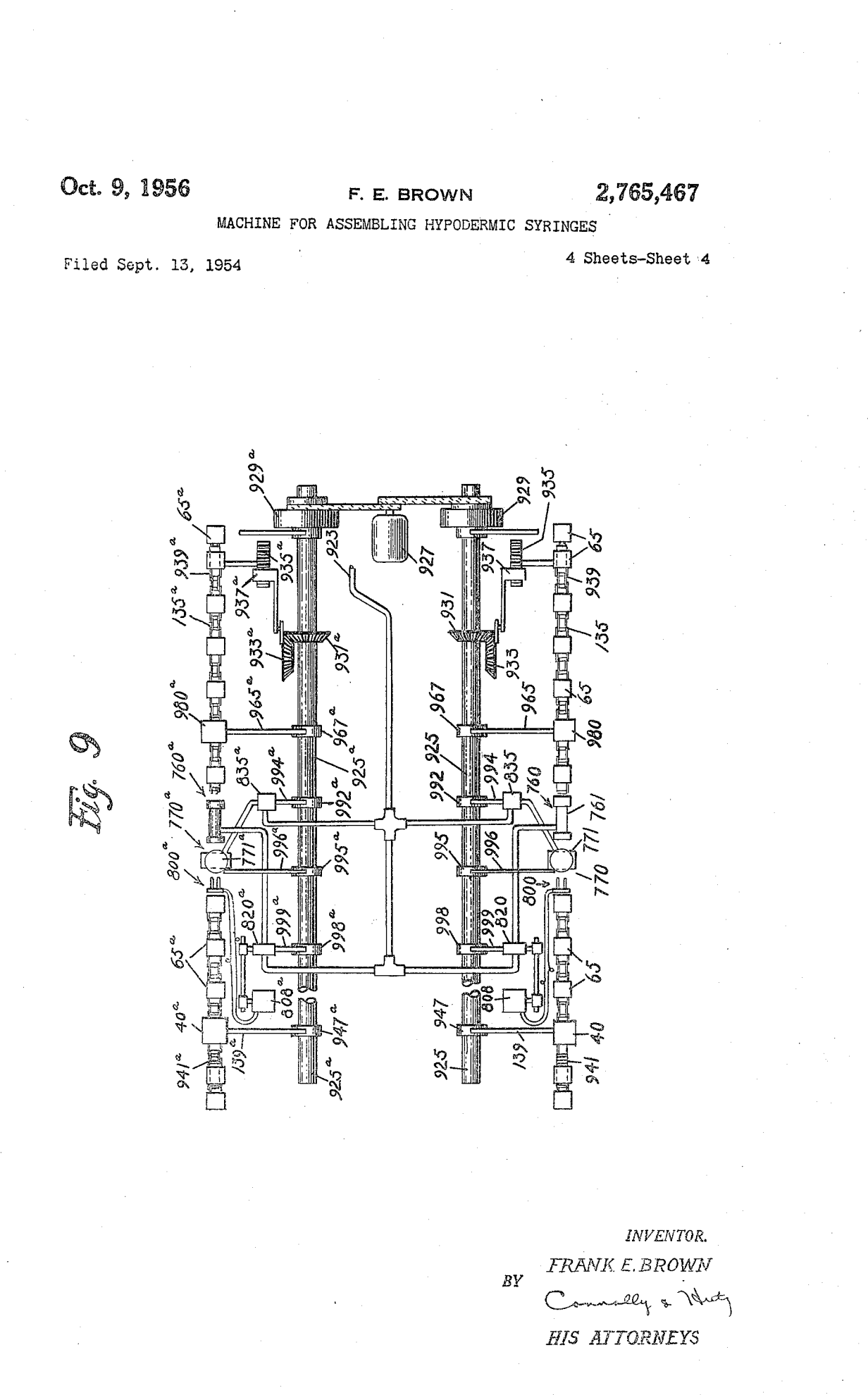

Fig. 9 shows the main drive and control mechanisms employed for operating the two assembly lines of the machine of this invention. Basically, it consists of two control and drive shafts 925 and 925a which are driven by a motor 927 through clutch devices 929 and 929a. Since both lines are identical, this description will be confined to the line operated by shaft 925. It can readily be seen that this shaft drives blocks 65 through bevel gears 931 and 933 and a ratchet and pawl drive mechanism 935 and 937, for the purpose of imparting stepwise rotation to drive sprocket 939, about which the chain conveyor 135 is engaged. An idler sprocket 941 engages the other end of chain conveyor 135 which carries blocks 65.

Shaft 925 further carries a plurality of cam members 967, 992, 998, 947 and 995. Cam 967 actuates a follower linkage 965 which in turn operates a kick out mechanism 980 which may be of any conventional form but which preferably includes structure for engaging the movable bar 170 on the conveyor blocks 65 along the return run of the conveyor chain 135 to eject the completed assembly from the machine. Cam 992, as previously described operates follower 994 and therewith valve 835 to control the servomotor 770 of the needle applying mechanism. Cam 995 operates follower linkage 996 to actuate the toggle mechanism 780 for controlling movement of the vial clamping members 792 and 794 of Fig. 3. Cam 998, as previously indicated, operates a follower 999 connected to control valve 820 in cooperation with solenoid 808 for the purpose of controlling the condition of servomotor 760. Cam 947 operates a follower linkage 139 connecting a mechanism 40 which controls opening of the blocks 65 for receiving the partially assembled glass cartridge vials in a manner more particularly described in my said copending applications. In so far as the present invention is concerned, the control mechanism 40 may be identical with the control mechanism 980. A source of fluid under pressure, 923, is connected with respective control valves 820 and 835 for an obvious purpose.

From the foregoing description, it should be apparent that the many reciprocating members or other mechanisms employed for transferring the plunger stoppers from one point in the machine to another, may be actuated by various pneumatic, electrical and/or mechanical means well known in the art. Further, it will be appreciated that various other modifications and equivalents may be employed without departing from the spirit of the invention, which is to be limited only by the scope of the appended claims.

What is claimed is:

1. A machine for orienting, feeding and applying covered double pointed hypodermic needles to filled and puncture stopper sealed medicament containing vials, said needles having a flesh piercing end and a puncture stopper piercing end, comprising a rotatable storage hopper having an open mouth for receiving, tumbling and discharging a plurality of said covered needle assemblies, a delivery chute positioned to project into the open mouth of said hopper and including structure for receiving and transporting said covered needles with the flesh piercing end depending by force of gravity, conveyor means including structure for supporting and transporting a plurality of said filled and sealed cartridge vials in sequence along a linear path, a needle applying mechanism positioned to overlie the path of said conveyor means and including structure for engaging and precisely positioning a supported vial beneath said needle applying mechanism, said needle applying mechanism further including structure for receiving and applying said covered needle assemblies to said vials one by one, and a needle inverter means connected between said delivery chute and said needle applying mechanism and including structure for orienting and selectively delivering said covered needles to said applying mechanism.

2. A machine for orienting, feeding and applying covered double point hypodermic needles over medicament containing cartridge vials having a sealed end including a puncturable rubber stopper comprising, a storage hopper for receiving and storing a plurality of said covered needles, means connected with said hopper for receiving covered needles from said hopper in sequential alignment and transporting the needles to a predetermined position with the flesh-piercing end depending by the force of gravity, conveyor means in proximity with said hopper including structure for supporting and transporting a plurality of cartridge vials, needle applying mechanism positioned adjacent said conveyor means underlying said feeding structure adjacent said predetermined position, and including structure for releasably retaining a cartridge vial in a precise vertical position, inverter means connected between said feeding means and said needle positioning means for transferring said covered needles from said predetermined position to said needle applying mechanism while inverting the needle to present one pointed end towards the puncturable stopper of the underlying vial, and synchronized control means for operating said conveyor means, said needle applying mechanism and said needle inverting means in a predetermined sequence.

3. A machine for orienting, feeding, and applying covered hypodermic needles including a double pointed hypodermic needle providing a flesh piercing end and a stopper puncturing end, a holder connected to said needle intermediate its end and including an axially extending sleeve adjacent said puncture stopper and a removable plastic cover overlying said flesh piercing end, over medicament containing cartridge vials having a sealed end including a puncturable rubber stopper, said needle assemblies including a double pointed hypodermic needle providing a flesh piercing end and a stopper puncturing end, a holder connected to said needle intermediate its end and including an axially extending sleeve adjacent said puncture stopper and a removable plastic cover overlying said flesh piercing end, comprising, a rotatable storage hopper for receiving a plurality of covered needle assemblies, means to rotate said hopper, a plurality of filled and stoppered cartridge vials and transporting the same in alignment along a linear path, a needle applying mechanism associated with said conveyor means and including a pair of relatively movable clamping members positioned to overlie the path of movement of said conveyor means, said mechanism including structure for moving said clamping members together when said conveyor means positions a filled cartridge vial thereunder and for firmly clamping said so positioned vial firmly therebetween, delivery means connected between said hopper and said applying mechanism and including structure for transporting a covered needle assembly from said hopper to said applying mechanism with the stopper puncturing end oriented to project towards said vials on said conveyor, a sensing mechanism positioned in proximity with said conveyor means overlying the path of movement of said cartridge vials and including electrically conductive fingers positioned to contact the top of a vial as the conveyor moves along its linear path, and means connected between said sensing means and said delivery means for controlling movement of said covered needle assembly to said positioning mechanism only in the event said filled cartridge vials contain an electrically conductive end closure cover member.

4. A machine as set forth in claim 3 in which said needle applying mechanism includes a fluid pressure differential motor, a reciprocable actuator rod connected with said motor and having an actuating end including an axially directed recess, said recess having a contour conforming to the contour of the cover of said flesh piercing end of the needle, said clamping blocks including vertically directed recessed grooves for receiving the covered needle assembly from said delivery means and accommodating movement of said actuator rod into contact with the covered end of the needle assembly to permit forcing of the needle assembly over the upper sealed end of the vial.

5. A machine as set forth in claim 1 in which said needle inverter means includes a fluid pressure differential motor, an actuator rod connected to be reciprocated by said motor structure cooperating with said motor and said needle applying mechanism to so position a covered needle assembly as to be movable by said actuator rod towards said applying mechanism with the puncture stopper piercing end presented towards an underlying vial, and means cooperating with said conveyor means and said motor to energize the motor upon actuation of said sensor means.

6. A mechanism for applying covered hypodermic needle assemblies having a vial fitting end to filled and puncture stopper sealed, medicament containing vials comprising a needle assembly positioning and applying mechanism including a pair of relatively movable clamping jaws, vertically directed grooves in said jaws of such shape and dimensions as to receive a sealed and filled vial therebetween while simultaneously receiving a covered needle assembly in vertically oriented overlying relationship, said applying mechanism further including structure for moving said so positioned needle assembly in a vertically downward direction to force the vial fitting end over the upper end of a clamped vial, and means for sequentially feeding covered needle assemblies to said needle applying mechanism with the vial fitting end directed vertically downwardly.

7. A machine as set forth in claim 6 including structure for moving said clamping jaws comprising an interconnected toggle linkage, and cam and cam follower control means for actuating said toggle linkage in an intermittent manner.

8. A machine as set forth in claim 3 in which said sensing mechanism includes a pair of spaced, electrically vial contacting fingers, a solenoid electrically connected in circuit with said fingers to be energized upon completion of a circuit across said fingers, a source of fluid under pressure, a fluid pressure differential motor connected with said inverter means and said pressure fluid source and including an actuator element for moving needle assemblies received from said delivery chute to said needle applying mechanism, and a valve between said pressure fluid source and said motor and adapted to be selectively controlled by said solenoid to energize said motor.

References Cited in the file of this patent

UNITED STATES PATENTS

| | | |
|---|---|---|
| 1,480,444 | Holman | Jan. 8, 1924 |
| 2,479,159 | Girard | Aug. 16, 1949 |